United States Patent [19]

Pazzaglia

[11] Patent Number: 5,092,511
[45] Date of Patent: Mar. 3, 1992

[54] DEVICE FOR THE TRANSLATION OF PIECES TO BE PROCESSD ON AUTOMATIC MACHINERY, ESPECIALLY ON CONTINUOUS-OPERATION WELDING MACHINES

[75] Inventor: Luigi Pazzaglia, Bologna, Italy
[73] Assignee: Officine Cevolani, Bologna, Italy
[21] Appl. No.: 535,158
[22] Filed: Jun. 8, 1990
[51] Int. Cl.$^5$ .................. B65G 25/02; B65G 25/00
[52] U.S. Cl. ........................ 228/47; 198/468.1; 198/740
[58] Field of Search ............. 198/468.1, 740; 74/50; 219/64; 228/47

[56] References Cited

U.S. PATENT DOCUMENTS 4,548,313 10/1985 Occhialine et al. ............ 198/468.1
4,744,460 5/1988 Pazzaglia ...................... 198/740

Primary Examiner—Richard K. Seidel
Assistant Examiner—Jeanne M. Elpel
Attorney, Agent, or Firm—Charles E. Brown

[57] ABSTRACT

A translation device for can bodies consisting in a supporting group, on one end, a pushing element of the same and jointed on the opposite end, to a supporting structure and connected, in of its intermediate points, to crank movement mechanisms which allow the group itself to make a pendular trajectory which is alternatively positive and negative according to the advancement of the can bodies, between two opposite positions, one being the operative pick-up position of the can bodies and the other being the dropping-off of the same; a drive cam element is foreseen to act on the pushing element in such a way as to permit the same pushing element to carry out a rectilinear trajectory of can body engaging interference when it crosses the positive trajectory, and of non-interference when the pushing element crosses the negative trajectory.

6 Claims, 3 Drawing Sheets

FIG.2
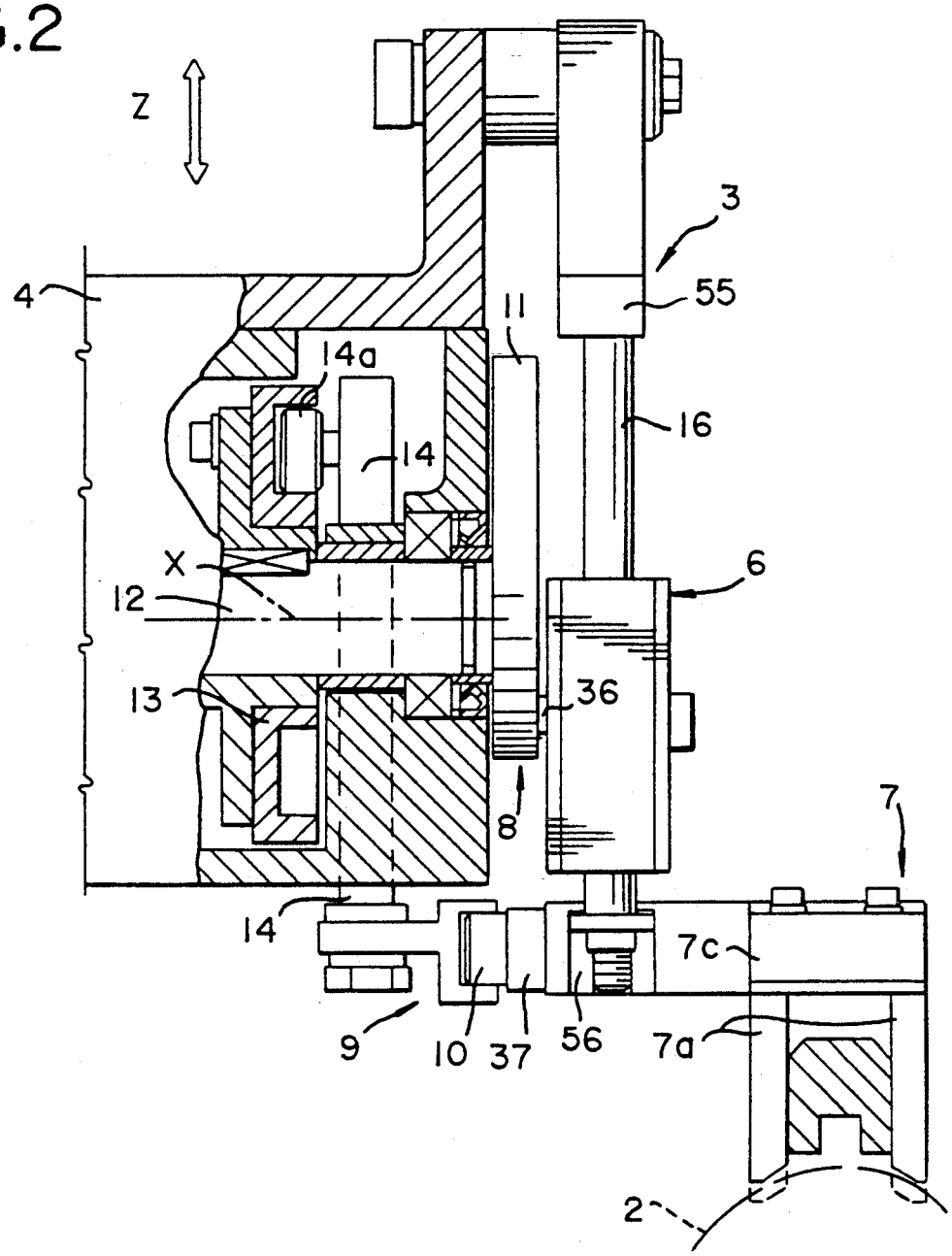
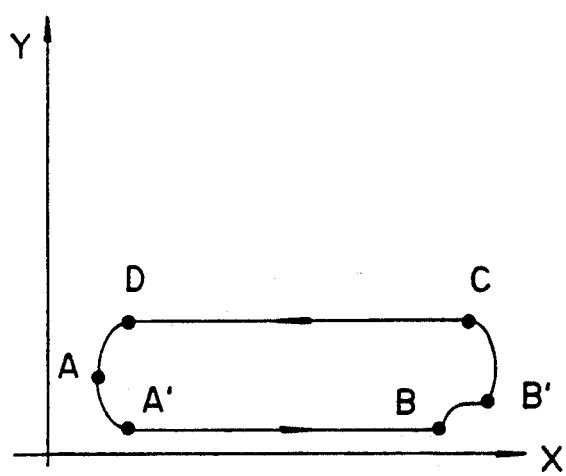
FIG.4

DEVICE FOR THE TRANSLATION OF PIECES TO BE PROCESSD ON AUTOMATIC MACHINERY, ESPECIALLY ON CONTINUOUS-OPERATION WELDING MACHINES

SUMMARY

This device for the translation of pieces consists in a group (6) which is found transversally in respect to the advancement trajectory for the can bodies (2), supporting, on one end, a pushing and fulcrum element (7) for the same can bodies, at the opposite end, to a supportive structure (4) and connected, in one of its intermediate points, to some crank movement mechanisms (8) designed to allow the same group to carry out a pendular trajectory which is alternatively positive and negative, i.e. aligned with a can body path and operative and out of alignment with the can body path and inoperative, according to the advancement of the can bodies (2), between two opposite pick-up and drop-off positions of the same; the trajectory of the pushing element (7) is delegated to a drive-cam (9), defining the horizontal component and is associated to a command cam (13) which defines the vertical component (FIG. 2).

DESCRIPTION

The present invention describes a device for the translation of pieces being processed on automatic machinery, particularly on welding machines for continuous-operation cylindrical can body welding machines.

The use of different devices is noted for the translation of pieces in continuous-operation machinery, such as transport teeth, which pick up the piece from one position in order to transport it to another.

Usually these devices must satisfy various necessities on the inside of the machinery in which they are working: first regards the movement of the pieces which, in most cases, must follow a rectilinear trajectory: secondly, intrinsic one regards the combined movement of their structural elements which must come into contact with the piece being processed at the right moment and at the desired speed and must transport it to a defined point, even at a calculated drop-out speed; following this working cycle they must go back to the departure position in order to be able to pick up a new piece. Thirdly, very often, these devices are required to work in high production speeds and in extremely difficult conditions, due to the fact that the machinery they are mounted on are generally in continuous operation.

Currently, the methods adopted for fulfilling the above-mentioned requirements are of various types: chains equipped with teeth, teeth-carrying slides activated by corresponding mechanisms, etc.

These means are sufficiently suitable for fulfillment of the first and second of the mentioned requirements, but prove to be inadequate if utilized on machinery functioning at a very high speed and with a notable precision in the transportation of the various can elements. One very obvious example of this inadequacy is found in resistence welders for metallic containers, where one of these devices is utilized to introduce the metallic container bodies between the welding rollers. In a machine of this type, all the operations must be extremely precise and the pick-up of the can bodies must be carried out in function of the previous transportation organs, and the insertion of the same can bodies between the rollers must be effected at a speed, horizontally, which is equal to the tangential speed of the welding rollers.

The translation device, which up to now has been used with sufficient efficiency on this kind of machinery, is principally composed of: a tooth activated by means of a pushing element, supported by an articulated parallelogram, all situated orthogonally in respect to the advancement of the can bodies. The parallelogram is motorized and its movement (and therefore also that of the tooth), is defined by a series of spiked wheels and through means of a cam, causing the device to carry out an operative movement, i.e. of engagement with the cylindrical can elements, in points coinciding on one end with the speed of the previous transportation organs, and on the other with the tangential speed of the welding rollers.

This kind of device has, at any rate, shown some imperfections of nonirrelevant importance: one of these is the high number of mechanisms utilized for connecting the device to the motor apparatus of the machinery, making it rather expensive and fragile and therefore causing it to be less reliable in the long run. Moreover, this solution makes the setting up operations of the device itself on the machinery lengthy and tedious, and the space it occupies is big enough to influence the entire architecture of the welding machine with consequent negative aspects, also from an electrical point of view, since this device is placed right on top of the welding rollers and between their connection bars to the transformer.

Therefore, the purpose of the present invention is that of eliminating the inconveniences mentioned hereof through the realization of a piece translator which is directly connected to the machine's motor apparatus, utilizing a pendular motion and allowing a rapid regulation of the device in function of the speed actuated by the various organs proceeding and following the device itself.

The invention, which is characterized by our claims, solves all the above-mentioned inconveniences with a translation device for can bodies consisting in a supporting group, on one end, a pushing element of the same and jointed on the opposite end, to a supporting structure and connected, in one of its intermediate points, to crank movement mechanisms which allow the group itself to make a pendular trajectory which is alternatively positive and negative according to the advancement of the can bodies, between two opposite positions, one being the operative pick-up position of the can bodies and the other being the dropping-off of the same; a drive cam element is foreseen to act on the pushing element in such a way as to permit the same pushing element to carry out a rectilinear trajectory of can body engaging interference when it crosses the positive trajectory, and of non-interference when the pushing element crosses the negative trajectory.

One of the advantages obtained through the present invention consists essentially in the fact that the device utilizes, for its own movement, a pendular motion; this assures that the trajectory followed by the device for picking up the can body and bringing it to the welding rollers, has a higher speed of execution in comparison to the return trajectory, which is carried out in the opposite direction of the previous one; this fact allows the use of the device also in other points of the machine where it could eventually be necessary to pick up can bodies, and in which there are other kinds of can transportation organs, having different transportation speeds.

The invention is described in greater detail further on with the help of drawings representing a purely illustrative and not limited form of realization, in which:

FIG. 2 is a fragmentary vertical sectional view taken along the line II—II of FIG. 1;

FIG. 4, shows the trajectory variations of the mentioned device in respect to the advancement of the pieces being processed.

Figure 1:
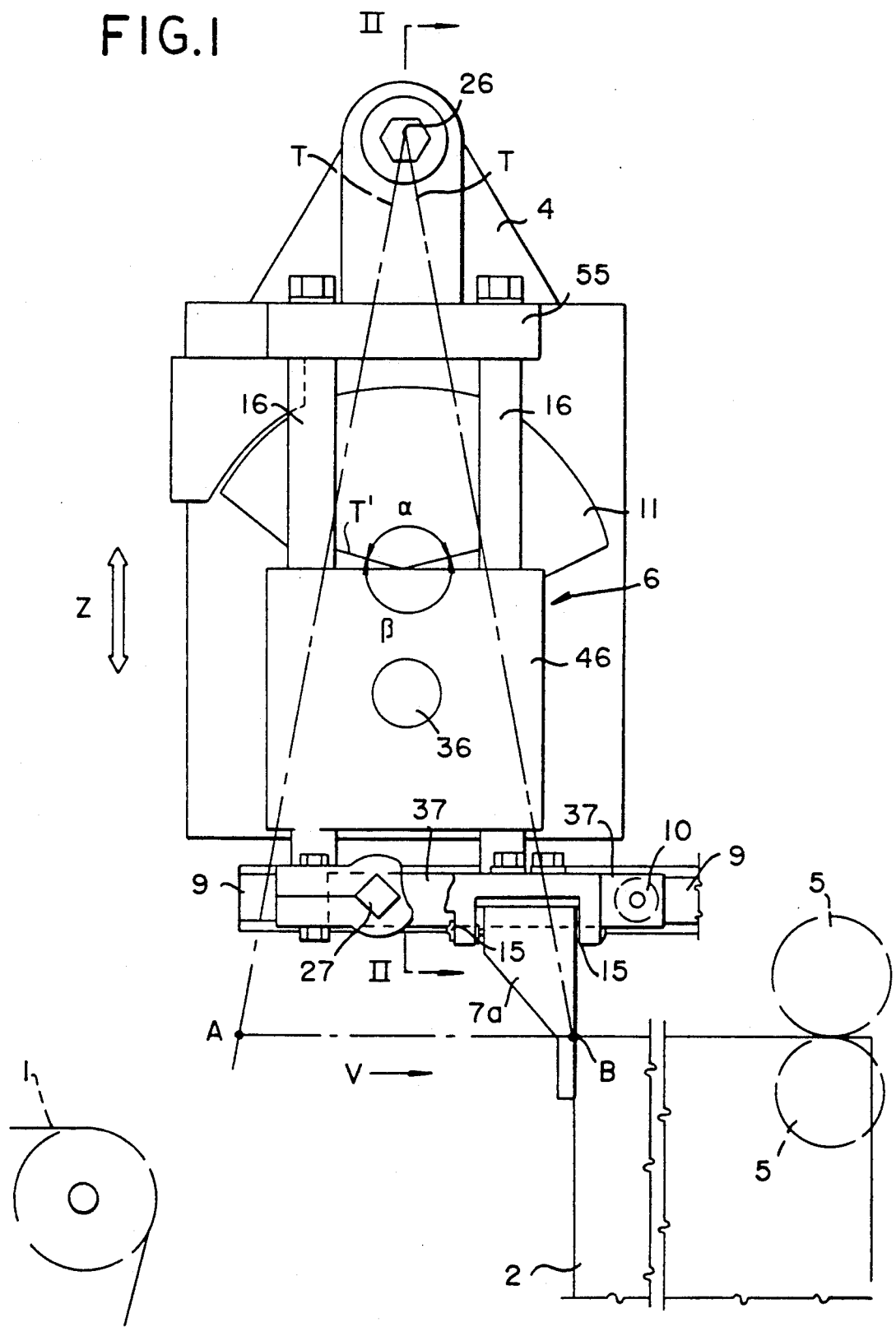
FIG. 1 is a front elevational view of the device inserted in a continuous welding machine.

In conformity with the attached figures, the overall device in question, indicated by the numeral 3 is utilized on continuous welding machinery in order to pick-up the cylindrical can elements (2) from point A, characterized by high speed, and transport them to drop-off point B, representing a welding station equipped with a pair of opposite rollers (5) operating at a well-defined tip speed.

In greater detail, it will be seen that the device (3) includes a mobile group (6) placed perpendicularly to the horizontal line of advancement (V) of the can bodies (2) and jointed, at one of its ends, at pivot (26), to the supporting structure (4) of the welding machine, while on the other end which is mobile, a pushing element (7) is found. Group (6), which includes a pair of parallel cylindrical bars (16) which are connected together by upper and lower blocks (55),(56), is also joined in a third intermediate point by a holding and sliding cursor (46) found along the mentioned bars (16) and connected to a crank plate (11) by a pin (36) which is in turn connected and joined in rotation to a motorized shaft (12), sustained on the inside of the supporting structure (4); the plate (11), the pin (36), and the shaft (12) substantially represent the movement mechanism of the group (6).

The constraint point between group (6) and plate (11) is effected eccentrically in respect to the rotation axis (X) of the motor shaft (12) (which is in phase with the entire machine on which the mentioned device is applied) and in this way the movement of the entire group (6), made possible by the synchronization deriving from the above-mentioned constituting elements, is carried out with pendular motion (in FIG. 1, the T traces define the axes of the opposite positions), alternatively positive and negative with reference to the advancement of the can bodies (2), and between two opposite positions: one for operative pick-up, in which the pushing element (7) goes in the direction of the pick-up point (A) and is in contact with the can body (2), and the other for drop-off, in which the pushing element (7) is found in position B in correspondence of which the can body is picked-up by welding rollers (5) (these opposite positions A and B are connected by broken lines in FIG. 1).

The above mentioned pushing element (7) is more precisely composed of a pair of toothed protruding points (7a) which are identical and which are placed one beside the other, in such a way as to provide a wide contact surface with the can body (2) to be translated. These toothed protruding points (7a) are fixed to group (6) by means of a transversal rod (7c) which also permits the variation of the angle of contact with the can body (2) by means of two adjustment screws (15) (see FIG. 1) for each protruding point, put in contact on two opposite surfaces of the protrusion itself. The bar is also fixed to a horizontal shaft (27) that passes transversally and is neutrally supported by the lower block (56); from the posterior side of this lower block (56), the shaft (27) is fixed to a connecting rod (37) which is equipped, on it's free end, with a roller (10) sliding on the inside of a drive-cam element (9) which is rectilinear and positioned parallely to the horizontal advancement (V) of the can bodies (2) and of a length not inferior to that of the oscillation width of group (6) for reaching the two opposite ends.

Figure 3:
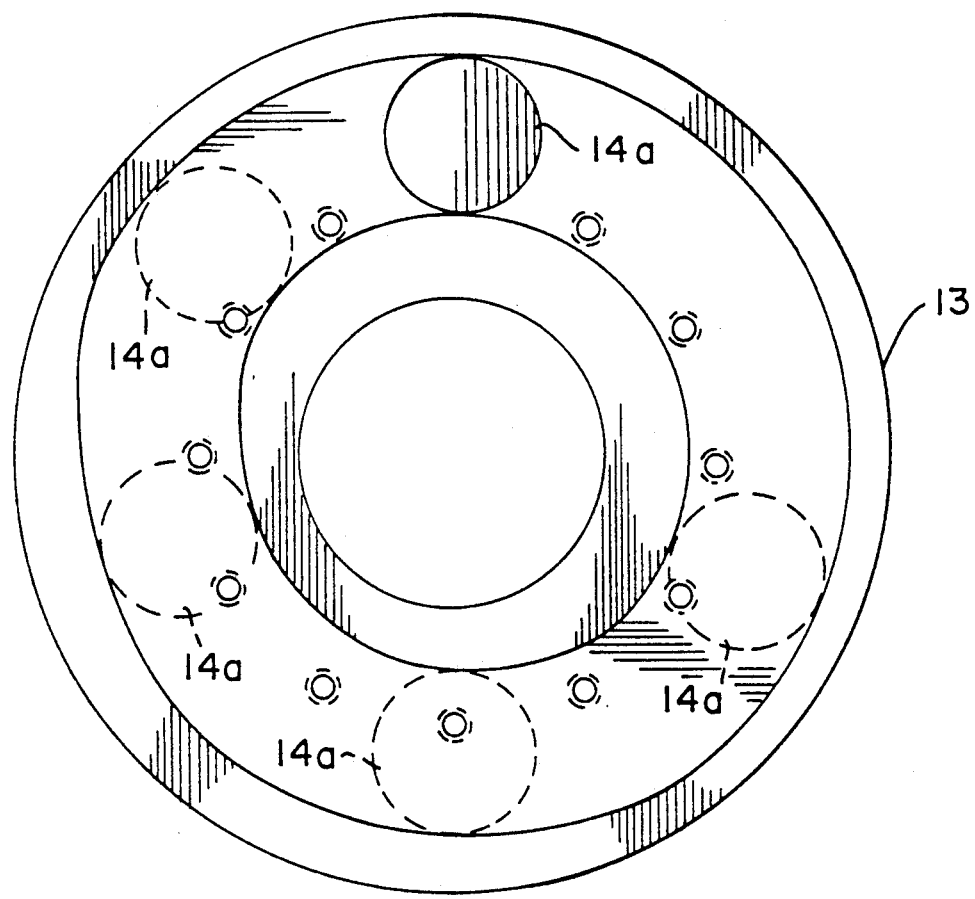
FIG. 3 is an elevational view of the control cam.

This drive-cam element (9) is connected underneath to two vertical rods (14) (only one of which is shown) sliding on the inside of the supporting structure (4) and equipped overhead with a cam-follower roller (14a) coupled to an internal command cam (13). This command cam (13) is joined in rotation to the motor shaft (12) in order for the drive-cam element (9) to vary its own distance in direction Z, which is perpendicular to the advancement direction V of the can bodies at a value corresponding to the eccentricity of the command cam (13). The command cam (13) is shown in FIG. 3 and the various positions of the cam follower roller (14a) are shown schematically with respect to the command cam (13).

As shown in FIG. 4, the pendular trajectory followed by teeth (7a) is traced by a line closing in a certain ellipsoidal area (the X coordinate in the graph represents the length, while the Y coordinate represents height). In practice, the translation movement of the can bodies (2) is carried out during the positive oscillation of group (6) (during which the pushing in direction of V is made from A' to B), with the drive-cam element (9) in its lowered position. Then the command cam (13) intervenes and begins moving the drive-cam element (9) upwards (direction Z) which, by means of a roller (10), produces an oscillation around the shaft (27) of the rod (37) and along with this, of the pushing element (7) in a clockwise direction. Looking at FIG. 1 (segment B'-C of FIG. 4): the control of this rotation, along with the horizontal speed of the pushing element (7) defined by the pendular motion, can be calculated in such a way as to allow a drop-off of the can body (after the can body has been introduced between the welding rollers) absent of vibrations or non-desired pushing. In the meantime, the pendular synchronization of group (6) produces a translation of pushing element (7), however in an opposite direction of the previous positive oscillation and with a lower speed due to the fact that angle ($\beta$) between trace lines T', which are perpendicular to the trace lines T, is bigger than angle $\alpha$(segments B'-C and C-D).

Of course, since a pendular motion is present, the oscillation speed of group (6) can be modified on the basis of working necessities: for example, in the case of the translation of can bodies, the positive oscillation must have a certain speed since the can must first be introduced into the welding rollers, while return negative oscillation can be higher speed than the previous one, in such a way as to increase the productivity of the entire device, while decreasing idle time. Moreover, this speed diversification gives time to the devices for picking-up the can bodies from transport organs which do not allow for speed adjustments. Another important consideration is given by the possibility of varying the placement and the conformation of the command cam (13) in order to diversively define points A' and B representing the starting and ending points of positive pushing on the can bodies.

The invention as designed, is susceptible to various modifications and variants, all falling under the inventive concept category, as for example the toothed protrusions (7a), which can be equipped with a spring placed between protrusions (7a) and bar (7c), thus reducing the possibility of warping of the contact edges of the picked-up can bodies. Moreover, all parts can be replaced with technically equivalent elements.

I claim:

1. A device for advancing tubular bodies into welding rollers of a continuous operation welding machine, said device comprising a support structure, a pick-up and pushing group having an upper end pivotally carried by said support structure in pendular relation for moving tubular bodies in sequence from an initial pick-up point along a straight line trajectory to a drop-off point where a tubular body engages said welding rollers, said support structure carrying a drive shaft of said welding machine, said group having a lower pusher, first drive means connecting said drive shaft to an intermediate part of said group for moving said pusher back and forth between said points, and control means for moving said pusher normal to said straight line trajectory in timed relation to said back and forth movement wherein said pusher has a rectilinear path of movement including an operative portion engaged with a tubular body and an inoperative portion wherein said pusher is spaced from the path of tubular bodies between said points, said control means including a longitudinally extending cam and a cooperating cam follower connected to said pusher, means mounting said cam for movement relative to said support structure in said normal direction, and second drive means connecting said cam to said drive shaft for moving said cam in said normal direction.

2. A device according to claim 1 wherein said group includes a pair of bars, said first drive means includes a cursor slidably mounted on said bars, a crank plate carried by said drive shaft for rotation with said drive shaft, and a drive pin connection between said crank plate and said cursor.

3. A device according to claim 2 wherein said second drive means includes said means mounting said cam includes at least one support rod slidably carried by said support structure, and means connecting said support rod to said drive shaft for reciprocating axial movement by said drive shaft.

4. A device according to claim 1 wherein said second drive means including said means mounting said cam includes at least one support rod slidably carried by said support structure, and means connecting said support rod to said drive shaft for reciprocating axial movement by said drive shaft.

5. A device according to claim 4 wherein said means connecting said support rod to said drive shaft are cam means.

6. A device according to claim 4 wherein said means connecting said support rod to said drive shaft include a cam carried by said drive shaft for rotation, and a cam follower engaging said last mentioned cam and supporting said support rod.

* * * * *